Figure 1:
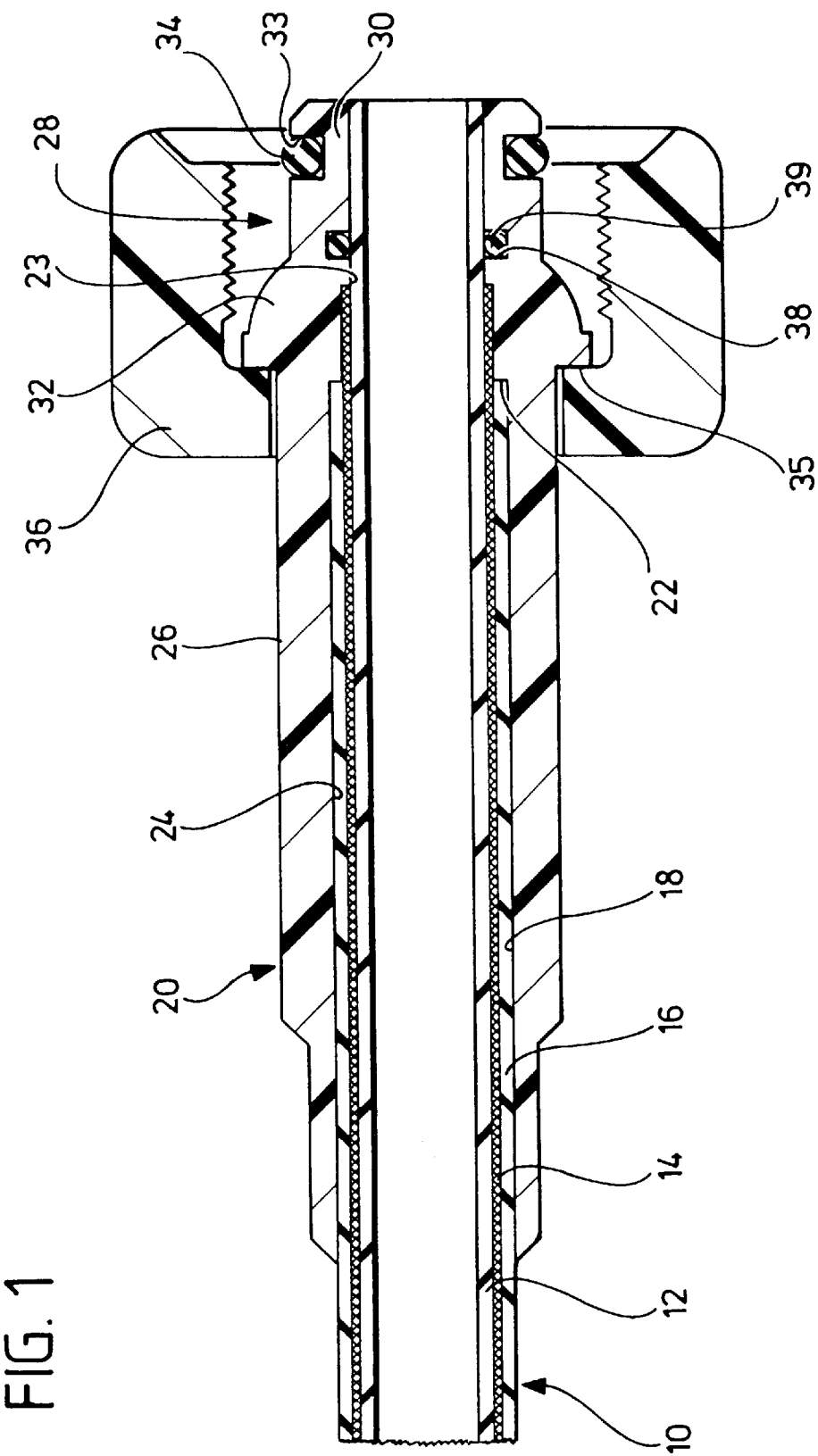

United States Patent [19]
Nathan et al.

[11] Patent Number: 6,123,111
[45] Date of Patent: Sep. 26, 2000

[54] HIGH PRESSURE HOSE HAVING A FITTING FOR ATTACHMENT TO A CORRESPONDING CONNECTOR MEMBER

[75] Inventors: Robert Nathan, Backnang; Johann G. Wesch, Berglen; Emil Scheef, Waiblingen, all of Germany

[73] Assignee: Alfred Kärcher GmbH & Co., Winnenden, Germany

[21] Appl. No.: 09/270,913

[22] Filed: Mar. 16, 1999

Related U.S. Application Data

[63] Continuation of application No. PCT/EP97/05147, Sep. 19, 1997.

[30] Foreign Application Priority Data

Sep. 24, 1996 [DE] Germany .................. 196 39 055

[51] Int. Cl.[7] ........................ F16L 11/112; F16L 35/00
[52] U.S. Cl. ..................... 138/109; 138/110; 138/123; 138/124
[58] Field of Search ........................ 138/109, 110, 138/123, 124

[56] References Cited

U.S. PATENT DOCUMENTS

| | | | |
|---|---|---|---|
| 1,516,452 | 11/1924 | Neuschel | 138/124 |
| 1,588,606 | 6/1926 | Oden | 138/127 |
| 1,801,403 | 4/1931 | White | 138/124 |
| 2,236,731 | 4/1941 | Oberly | 138/110 |
| 2,273,398 | 2/1942 | Couty et al. | 138/109 |
| 2,393,496 | 1/1946 | Stedman | 138/126 |
| 2,561,351 | 7/1951 | Fentress . | |
| 3,791,415 | 2/1974 | Lawless et al. | 138/127 |
| 4,366,746 | 1/1983 | Rosecrans | 138/125 |
| 4,415,389 | 11/1983 | Medford et al. | 138/109 |
| 5,024,419 | 6/1991 | Mulvey | 138/127 |
| 5,333,650 | 8/1994 | Folkman | 138/110 |
| 5,413,147 | 5/1995 | Moreiras et al. | 138/109 |
| 5,526,846 | 6/1996 | Maloberti | 138/174 |
| 6,009,907 | 1/2000 | Secher | 138/110 |

FOREIGN PATENT DOCUMENTS

| | | |
|---|---|---|
| 0 338 880 | 10/1989 | European Pat. Off. . |
| 881 132 | 6/1953 | Germany . |
| 913 601 | 6/1954 | Germany . |
| 1 895 394 | 2/1964 | Germany . |
| 2 140 311 | 2/1972 | Germany . |
| 24 13 057 | 12/1974 | Germany . |
| 33 20 562 | 12/1983 | Germany . |
| 86 24 670 | 12/1986 | Germany . |
| 86 24 198 | 12/1987 | Germany . |
| 295 03 585 | 5/1995 | Germany . |

*Primary Examiner*—James Hook
*Attorney, Agent, or Firm*—Barry R. Lipsitz; Douglas M. McAllister

[57] ABSTRACT

In order to produce a high pressure hose having a fitting for attachment to a corresponding connector member, wherein the fitting comprises a connecting element for establishing connection to the high pressure hose and a coupling element for establishing a nipple/sleeve connection to the connector member, in such manner that a cost effective connection between the high pressure hose and the fitting can be established within a short period of time during the assembly thereof, it is proposed that the connecting element be in the form of a socket piece into which one end region of the high pressure hose is inserted and that the fitting form an interlocking closure assembly with the high pressure hose.

17 Claims, 4 Drawing Sheets

HIGH PRESSURE HOSE HAVING A FITTING FOR ATTACHMENT TO A CORRESPONDING CONNECTOR MEMBER

This application is a continuation of PCT/EP97/05147 filed Sep. 19, 1997.

The invention relates to a high pressure hose having a fitting for attachment to a corresponding connector member, wherein the fitting comprises a connecting element for establishing a connection to the high pressure hose and a coupling element for establishing a nipple/sleeve connection to the connector member, wherein the connecting element is in the form of a socket piece into which an end region of the high pressure hose is inserted and the fitting forms an interlocking closure assembly with the high pressure hose, and wherein the high pressure hose comprises a resilient inner tube that is surrounded by a braided sleeve or a sleeve of woven fabric with which the fitting is in engagement, said sleeve being provided for absorbing tensile forces occurring in the high pressure hose.

High pressure hoses having a fitting for attachment to a corresponding connector member are known for example from the specifications of the German Utility Models DE 86 24 198 U1 and DE 86 24 670 U1 as well as from the German Patent specifications No. 881 132 and No. 913 601. Therein, a nipple projecting into the end of the hose and a clamping sleeve surrounding the end of the hose in the vicinity of the nipple for pressing the hose tightly against the nipple are employed for establishing a connection between the high pressure hose and the fitting. Such an arrangement has the disadvantage that the process of establishing the connection between the hose and the fitting is relatively tedious since the end of the hose has to be pressed into the annular region between the nipple and the compression sleeve with a considerable amount of force; in general, this can only be done by using an additional tool, and a not inconsiderable cost is associated therewith.

A high pressure hose comprising an inner tube surrounded by a woven fabric sleeve or a braided sleeve is known from U.S. Pat. No. 2,561,351. A fitting for attachment to a corresponding connector member engages in the woven fabric sleeve. In order to manufacture the high pressure hose with the end-fitting, an end region of the high pressure hose may be inserted into a mould whereafter this end region is cast in synthetic material. The initially viscous synthetic material thereby flows into the interstices of the woven fabric sleeve and thereafter cures to form an end-fitting. The connection between the high pressure hose and the fitting can thus be produced in a relatively simple manner and, in many cases, a connection of this type is sufficient to meet the requirements of mechanical stability and tightness. Nevertheless, it would be desirable if the connection could be made more mechanically stable, especially when the high pressure hose is being subjected to very high pressures.

The object of the present invention is to produce a high pressure hose having a fitting for attachment to a corresponding connector member in such manner that, during the assembly thereof, a reliable connection capable of withstanding very heavy pressure-induced loads can be established between the high pressure hose and the fitting within a short period of time in cost effective manner.

In accordance with the invention, this object is achieved in the case of a high pressure hose having a fitting of the type mentioned hereinabove in that the angle of twist of the braided sleeve is approximately 30° to 60°. The invention hereby makes use of the perception that the forces occurring in the high pressure hose itself during its pressurisation can be used to strengthen the connection between the high pressure hose and the fitting. Should the high pressure hose be subjected to a high pressure during operation, it will thereby then expand and its end region will be pressed against the socket piece, whereby a tight-fitting connection between the hose and the fitting will be established due to the interlocking closure assembly. It is thereby possible to dispense with additional compression or clamping sleeves surrounding the high pressure hose for fixing the hose to the fitting. The socket piece may be connected in non-rotatable manner to the coupling element so that the fitting will not comprise any moveable parts and consequently can be made extremely rugged.

The high pressure hose comprises a resilient inner tube which is surrounded by a braided sleeve or sleeve of woven fabric for absorbing the tensile forces occurring in the high pressure hose and the fitting engages in the braided sleeve. The braided or woven fabric sleeve forms a reinforcing element for the high pressure hose which, in comparison to the resiliently formed inner tube, has a rough surface in which the fitting can engage and thereby establish an interlocking closure assembly. If the high pressure hose is subjected to a high pressure, then the interior inner tube will attempt to expand and thereby press the braided sleeve outwardly against the fitting which forms an interlocking closure assembly with the braided sleeve. The interlocking closure assembly is reinforced by the pressurisation and consequently a tight-fitting connection between the hose and the fitting is established.

A particularly stable connection between the fitting and the high pressure hose is obtained due to the twist angle of the braided sleeve amounting to approximately 30° to 60° since the braided sleeve then adopts a very rigid and stable form under pressurisation.

It is expedient if the coupling element comprises a hose stem which is resilient deformable in the radial direction and if the inner tube of the high pressure hose is stripped of its braided or woven fabric sleeve when it is inserted into the hose stem. In an arrangement of this type, the high pressure hose penetrates the whole of the fitting which, at one end, comprises a hose stem that is insertible into a connector member, for example, into the pressure outlet of a high pressure washer. The braided or woven fabric sleeve surrounding the inner tube is removed from the end region of the high pressure hose being inserted into the hose stem so that the high pressure hose can expand radially in the vicinity of the hose stem when pressurization occurs. This expansion is conveyed to the resilient hose stem so that it too can expand a little in the radial direction and thereby produce a particularly tight-fitting connection with the connector member. Consequently, in an arrangement of this type, the tensile forces occurring in the high pressure hose when it is in use are not only used for attaching the sleeve to the fitting but are also additionally used for forming a particularly tight-fitting connection between the fitting and the connector member.

Provision may be made for disposing a sealing element between the high pressure hose and the fitting in a region that is stripped of the braided or woven fabric sleeve. As described above, the high pressure hose expands radially in that region thereof stripped of the braided or woven fabric sleeve when pressurization occurs. The result of this is that the sealing element located between the high pressure hose and the fitting is pressed against the fitting surrounding the hose. This in turn results in the high pressure hose forming a particularly tight-fitting connection with the fitting.

In one economically manufacturable embodiment, provision is made for forming the socket piece and the coupling element as a one-piece component of synthetic material.

In a particularly preferred embodiment of the invention, the component of synthetic material is provided as an injection moulding which is moulded around the end region of the high pressure hose. It is particularly advantageous in an arrangement of this type, if the end region of the braided or woven fabric sleeve of the high pressure hose is firstly laid bear, and if thereafter, this end region has synthetic material moulded therearound in a manner such that the synthetic material engages directly in the braided or woven fabric sleeve and thereby produces an interlocking closure assembly. When pressurisation occurs, the braided or woven fabric sleeve is pressed against the moulding of synthetic material by the underlying resilient inner tube and is thereby fixed thereto. Since the socket piece and the coupling member are in the form of a one-piece moulding of synthetic material, the additional metal parts which usually have to be expensively produced by means of a metal cutting tool can be dispensed with when manufacturing the fitting. In contrast thereto, the process of moulding around the bared braided or woven fabric sleeve of a high pressure hose is very economical and, at the same time, it is very effective in producing a stable and tight-fitting connection between the hose and the fitting.

The manufacture of the hose and the fitting can be simplified by making the inner tube, or an outer covering sleeve surrounding the braided or woven fabric sleeve, of the same synthetic material as the injection moulding. In this case, provision may be made for subjecting the moulding of synthetic material to a subsequent curing process.

It is provided in one advantageous embodiment that the end region of the high pressure hose comprise at least one lateral opening which is engaged by the injection moulding. In an arrangement of this type, the interlocking closure assembly between the socket piece and the high pressure hose may be achieved by virtue of the synthetic material penetrating the openings when injecting it around the end region of the high pressure hose.

An additional interlocking effect for the closure assembly can be obtained by disposing at least one projection on the inner wall of the socket piece.

A particularly stable connection between the high pressure hose and the fitting is achieved in one advantageous embodiment by virtue of the fitting comprising a resilient expansion element which is insertible into the high pressure hose for enlarging it in the radial direction. Due to the resilient expansion element, an additional radial force is applied to the high pressure hose, said force pressing the high pressure hose against the surrounding socket piece. The result of this is that a stable connection between the hose and the fitting is obtained without straining the hose by application of a high pressure. It is particularly advantageous hereby if the expansion element is arranged within the high pressure hose in the vicinity of a recess in the inner surface of the socket piece. The high pressure hose is thereby pressed into the recess in the socket piece by means of the expansion element and a particularly durable connection between the hose and the socket piece is produced.

It is advantageous if the expansion element comprises a conical enlarging section as the socket piece is thereby subjected not only to a radial force but also to a force effective in the axial direction since the conical enlarging section causes a change in the direction of the force being transferred from the expansion element to the hose, and, for example, from there to the socket piece.

The expansion element may, for example, be in the form of a resilient ring which is insertible into the high pressure hose.

In one advantageous embodiment, provision is made for the expansion element to be in the form of an expansion sleeve which is insertible into the high pressure hose. An arrangement of this type has the advantage that the high pressure hose is thereby made particularly stable at its end region.

In order to ensure in a very economical manner that the hose does not kink in the region thereof bordering on the fitting, it is provided in one particularly preferred embodiment of the invention that the fitting comprise an anti-kink device of synthetic material which is connected to the socket piece in one-piece manner. The socket piece, the coupling member and the anti-kink device can thereby be produced in a single operation during the moulding process around the end region of the high pressure hose.

Figure 2:
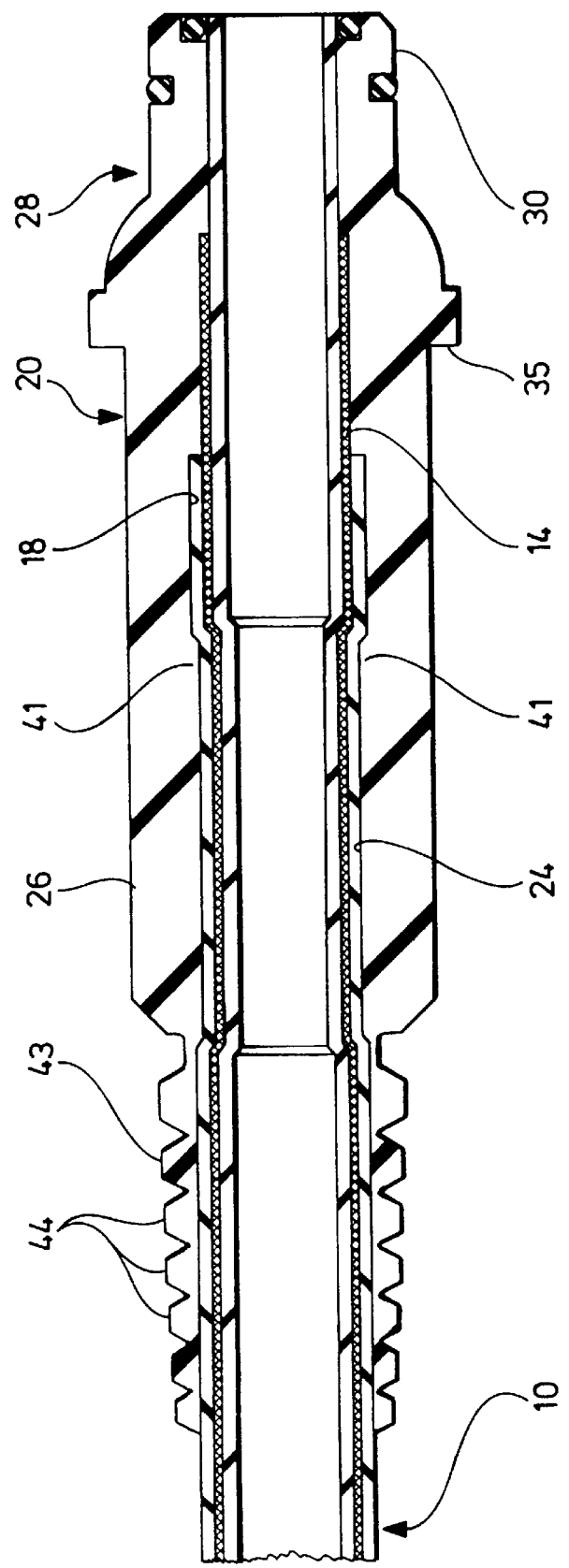
Figure 3:
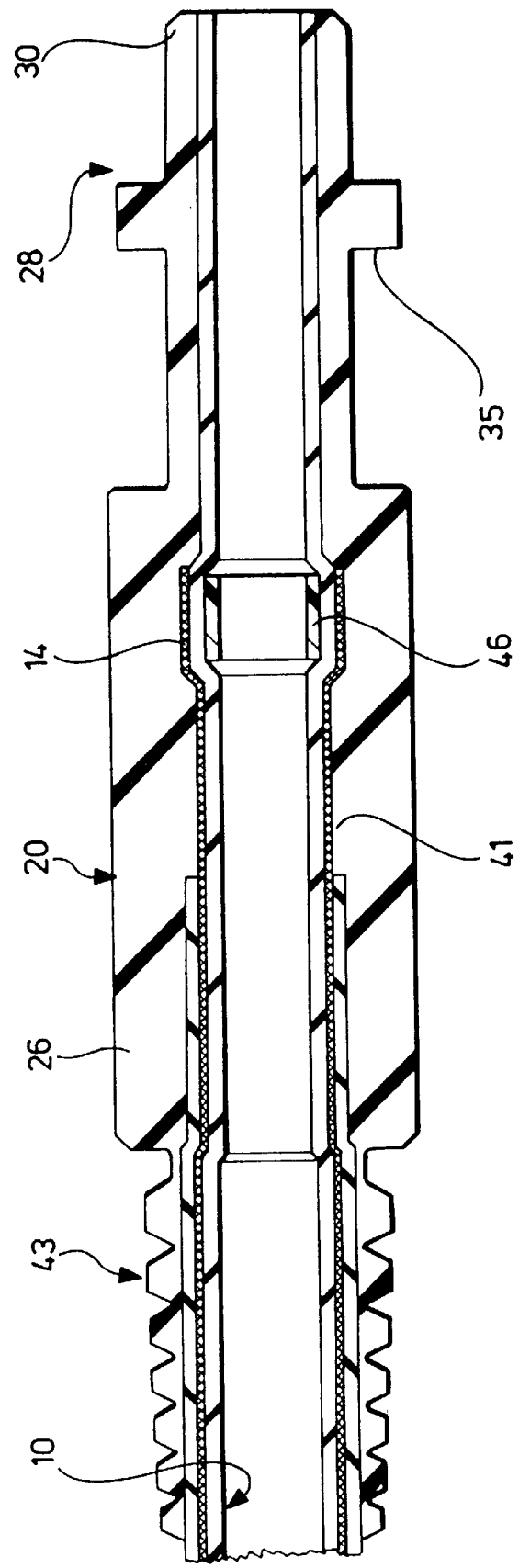

The subsequent description taken in conjunction with the drawing of preferred embodiments of the invention will serve to provide a more detailed explanation. Therein FIG. 1: shows a schematic longitudinal sectional view of a first preferred embodiment of a high pressure hose having a fitting for attachment to a corresponding connector member;

FIG. 2: a schematic longitudinal sectional view of a second embodiment;

FIG. 3: a schematic longitudinal sectional view of a third embodiment and

Figure 4:
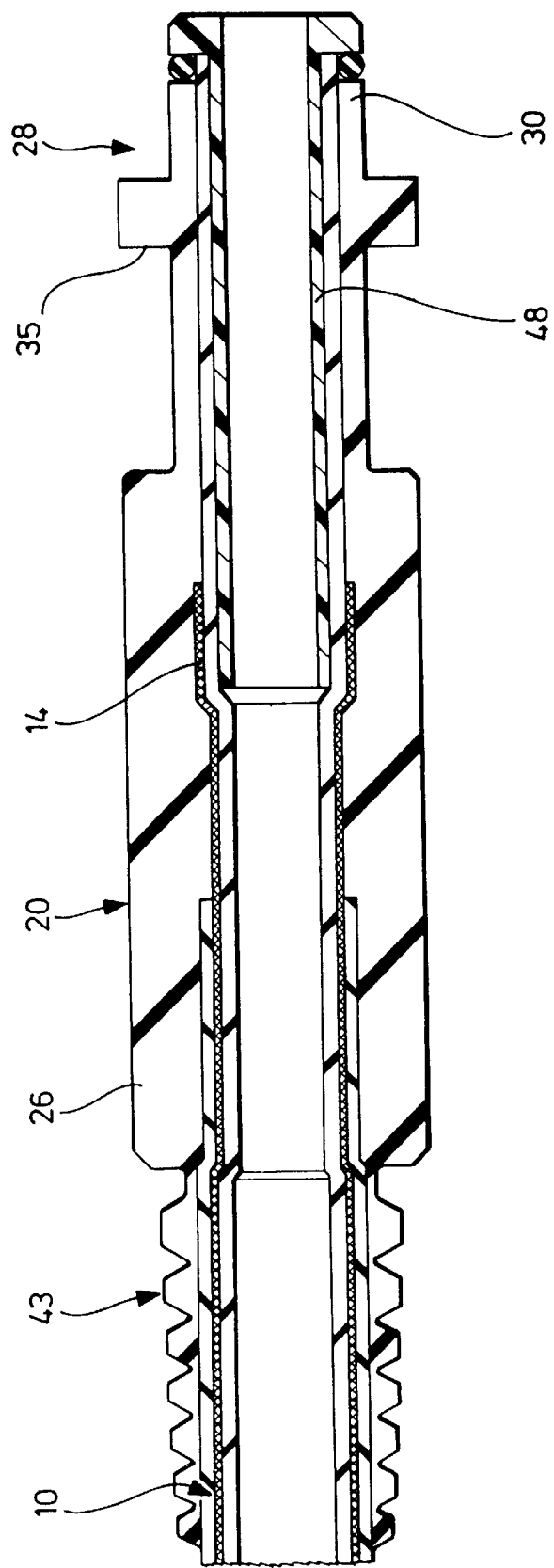

FIG. 4: a schematic longitudinal sectional view of a fourth embodiment.

The construction of the end-piece of a high pressure hose having a fitting for attachment to a corresponding connector member is illustrated in FIG. 1. The high pressure hose 10 is built up of three layers in the form of an innermost inner tube 12 which is made of a resilient synthetic material and surrounded by a braided sleeve 14 that absorbs the tensile forces occurring in the high pressure hose, the outer surface of this sleeve abutting on an outer cover sleeve 16 which is also made of synthetic material. The high pressure hose 10 penetrates a passageway 18 in a fitting 20 that is likewise made of synthetic material, this passageway 18 narrowing at a step 22 so as to comprise a frontal section 23 of smaller diameter and a rear section 24 of greater diameter. The fitting 20 takes the form of a socket piece 26 over the length of its rear section 24 and, over its frontal section 23, it comprises a coupling portion 28 including a hose stem 30 and a circumferential bead 32. An annular groove 33 accommodating an O-ring 34 is formed around the hose stem 30. The bead 32 is stepped at the side thereof remote from the hose stem 30 thus forming a stop face for a union nut 36 which surrounds but is spaced from the bead 32 and the hose stem 30. The hose stem 30 is insertible into a not further illustrated connector member which here, for example, may be the pressure outlet from a high pressure washer. The union nut 36 can be screwed onto a connection piece that is not illustrated in the drawing thereby establishing a tight-fitting connection between the fitting 20 and the connector member which is likewise not illustrated in the drawing.

The outer cover sleeve 16 was removed from the high pressure hose 10 over that portion thereof corresponding to the frontal section 23 and, in addition, the inner tube 12 was laid bear over that portion thereof corresponding to the hose stem 30 so that it abuts directly on the inner surface of the hose stem 30, whilst the braided sleeve 14 was laid bear over that portion thereof corresponding to the bead 32 so that the fitting 20 rests directly on the braided sleeve 14 in this region.

A circumferential U-shaped groove 38 accommodating a sealing ring 39 is formed in the wall of the passageway 18 in the region between the hose stem 30 and the bead 32.

The fitting 20 including the socket piece 26 and the coupling portion 28 is in the form of an injection moulding of synthetic material which is moulded around the end region of the high pressure hose. For the purposes of forming an interlocking closure assembly between the fitting 20 and the high pressure hose 10, the braided sleeve 14 is initially laid bare so that during the moulding process about the high pressure hose 10 the synthetic material will come into direct contact with the braided sleeve and can penetrate therein thereby forming an interlocking closure assembly.

When the high pressure hose 10 is being used, it is subjected internally to a high pressure as a result of which the resilient inner tube will expand radially and thereby press the bared braided sleeve 14 in the vicinity of the bead 32 against the fitting 20 so that the high pressure hose 10 will be immovably fixed to the fitting 20. Moreover, the expansion of the resilient inner tube 12 results in it being pressed tightly against the inner surface of the hose stem 30 thereby exerting a radially outwardly directed force thereon so that the hose stem 30, which is inserted during use of the high pressure hose 10 in the connector member that is not illustrated in the drawing, is then closely seated against the inner surface of the connector member. The pressure reigning in the interior of the high pressure hose when it is in use thus serves firstly for fixing the high pressure hose 10 to the fitting 20 and secondly, for forming a tight-fitting connection between the high pressure hose 10 and the fitting 20 as well as between the hose stem 30 and the corresponding connector member.

Further advantageous embodiments of a high pressure hose having a fitting for attachment to a corresponding connector member are illustrated in FIGS. 2, 3 and 4. To a large extent, these modified embodiments correspond to the embodiment illustrated in FIG. 1, they have mutually corresponding parts and these thus bear the same references as those in FIG. 1.

So as to improve the clarity of the presentation, the union nut 36, which, in each case, rests on a stop face 35, is not illustrated in FIGS. 2, 3 and 4. However, a respective union nut that establishes a releasable connection between the hose stem 30 and the connector member which is not illustrated in the drawing is also employed in each of the embodiments illustrated in FIGS. 2, 3 and 4 for the purposes of establishing a connection between the fitting 20 and a connector member which is not illustrated in the drawing.

Whereas in the case of the embodiment illustrated in FIG. 1 the socket piece 26 has a uniform inner diameter, in the case of the embodiment illustrated in FIG. 2, a circumferential projection 41 is provided in the passageway 18 in the region covered by the rear section 24, the high pressure hose 10 being additionally pressed into the socket piece 26 by virtue of this projection. The interlocking closure assembly between the fitting 20 and the high pressure hose 10 that has already been produced due to the engagement of the fitting 20 in the bared braided sleeve 14 is reinforced by the projection 41.

In the embodiment illustrated in FIG. 2, as is likewise the case in the subsequently described embodiments illustrated in FIGS. 3 and 4, the fitting 20 is combined in one-piece with an anti-kink device 43 surrounding the high pressure hose, this device being in the form of a plurality of successive circumferential ribs 44 whose wall thickness decreases with increasing distance from the hose stem 30. The anti-kink device 43 is manufactured together with the fitting 20 by means of a moulding process around the high pressure hose.

In addition to the projection 41 for increasing the effect of the interlocking closure assembly between the high pressure hose 10 and the fitting 20, there is employed in the embodiment illustrated in FIG. 3 a radially expandable straining ring 46 which is positioned within the high pressure hose 10. The straining ring 46 is positioned in a region corresponding to the bared braided sleeve portion 14 of the high pressure hose 10 so that the braided sleeve is pressed against the fitting 20 thereby. It is thus ensured that the high pressure hose 10 is also fixed to the fitting 20 when no pressure is being applied thereto since, in this case, the straining ring 46 provides the necessary tensile force in the radial direction.

In the embodiment illustrated in FIG. 4, an adapter sleeve 48 is employed instead of a straining ring, the adapter sleeve being insertible into the high pressure hose 10 and extending as far as the bared braided sleeve 14 which is then pressed thereby against the fitting 20. Due to the employment of the adapter sleeve 48, the high pressure hose 10 and the fitting 20 have a particularly rigid structure in the vicinity of the coupling portion 28 thereby simplifying the establishment of a connection between the coupling portion 28 and the connector member which is not illustrated in the drawing.

A stable connection between the high pressure hose 10 and the fitting 20 without the need to use additional clamping or compression sleeves is established in a simple manner in each of the embodiments due to the action of baring the braided sleeve 14 and effecting the moulding process directly around the high pressure hose 10 in this bared region.

What is claimed is:

1. A high pressure hose having a fitting for attachment to a corresponding connector member, wherein:

the fitting comprises a connecting element for establishing a connection to the high pressure hose and a coupling element for establishing a nipple/sleeve connection to the connector member, the connecting element is in the form of a socket piece into which an end region of the high pressure hose is inserted, with the fitting forming an interlocking closure assembly with the high pressure hose, the high pressure hose comprises a resilient inner tube that is surrounded by a braided sleeve or sleeve of woven fabric with which the fitting is in engagement, said sleeve being provided for absorbing tensile forces occurring in the high pressure hose, and the braided sleeve has a twist angle of approximately 30° to 60°.

2. A high pressure hose having a fitting in accordance with claim 1, wherein:

the coupling element comprises a hose stem which is resiliently deformable in the radial direction, and the inner tube of the high pressure hose is inserted into the hose stem stripped of its braided or woven fabric sleeve.

3. A high pressure hose having a fitting in accordance with claim 2, wherein a sealing element is arranged between the high pressure hose and the fitting in a region that has been stripped of the braided or woven fabric sleeve.

4. A high pressure hose having a fitting in accordance with claim 1, wherein a sealing element is arranged between the high pressure hose and the fitting in a region that has been stripped of the braided or woven fabric sleeve.

5. A high pressure hose having a fitting in accordance with claim 1, wherein the socket piece and the coupling element comprise a one piece component of synthetic material.

6. A high pressure hose having a fitting in accordance with claim 5, wherein the component of synthetic material is an injection molding which is molded around the end region of the high pressure hose.

7. A high pressure hose having a fitting in accordance with claim 6, wherein the end region of the high pressure hose comprises at least one lateral opening which is engaged by the injection molding.

8. A high pressure hose having a fitting in accordance with claim 6, wherein one of the inner tube and an outer covering sleeve surrounding the braided or woven fabric sleeve is made of the same synthetic material as the injection molding.

9. A high pressure hose having a fitting in accordance with claim 8, wherein the end region of the high pressure hose comprises at least one lateral opening which is engaged by the injection molding.

10. A high pressure hose having a fitting in accordance with claim 1, wherein at least one projection is disposed on the inner wall of the socket piece.

11. A high pressure hose having a fitting in accordance with claim 1, wherein the fitting comprises a resilient expansion element which is insertable into the high pressure hose for enlarging the hose in the radial direction.

12. A high pressure hose having a fitting in accordance with claim 11, wherein the expansion element is in the form of a resilient ring which is insertable into the high pressure hose.

13. A high pressure hose having a fitting in accordance with claim 11, wherein the expansion element is in the form of an expansion sleeve which is insertable into the high pressure hose.

14. A high pressure hose having a fitting in accordance with claim 11, wherein the expansion element comprises a conical enlarging section.

15. A high pressure hose having a fitting in accordance with claim 14, wherein the expansion element is in the form of a resilient ring which is insertable into the high pressure hose.

16. A high pressure hose having a fitting in accordance with claim 14, wherein the expansion element is in the form of an expansion sleeve which is insertable into the high pressure hose.

17. A high pressure hose having a fitting in accordance with claim 1, wherein the fitting comprises an anti-kink device of synthetic material connected to the socket piece in a unitary manner.

* * * * *